United States Patent [19]
Wakatsuki et al.

[11] Patent Number: 5,303,757
[45] Date of Patent: Apr. 19, 1994

[54] ANTI-SKID DEVICE FOR TIRE

[75] Inventors: Tomio Wakatsuki; Toshitaka Nishi; Satoru Ohto, all of Osaka, Japan

[73] Assignee: The Ohtsu Tire & Rubber Co., Ltd., Osaka, Japan

[21] Appl. No.: 46,845

[22] Filed: Apr. 14, 1993

[30] Foreign Application Priority Data

May 1, 1992 [JP] Japan ................................. 4-112829

[51] Int. Cl.$^5$ .............................................. B60C 27/02
[52] U.S. Cl. .................................. 152/216; 152/213 R
[58] Field of Search .................... 152/170, 213 R, 214, 152/216

[56] References Cited

U.S. PATENT DOCUMENTS 2,174,345  9/1939  Worthing ........................ 152/213 R
3,847,196  11/1974  Gomez ............................ 152/219 X
5,076,335  12/1991  Koshi ............................. 152/219 X

FOREIGN PATENT DOCUMENTS 2-151511  6/1990  Japan .

Primary Examiner—Michael W. Ball
Assistant Examiner—Francis J. Lorin
Attorney, Agent, or Firm—Sixbey, Friedman, Leedom & Ferguson

[57] ABSTRACT

A tire anti-skid device comprises a mounting member removably mounted on a side surface of a wheel of an automobile in such a manner as to be coaxial with the wheel; a plurality of arms made of elastic bodies, which radially extend from the mounting member; ground-contact portions each being formed by bending the leading edge of each of the arms, which are intended to be brought in contact with a tire tread surface; a ground-contact ring for connecting the adjacent ground-contact portions with each other, which is intended to be brought in contact with the tire tread surface; and reverse portions each being formed at a junction portion between the arm and the ground-contact portion, which are intended to reverse the ground-contact portions in such a manner that the inner surfaces in contact with the tire tread surface becomes the outer peripheral surfaces. The above anti-skid device is mounted to the tire in such a manner that the mounting member is mounted on the wheel in the state the ground-contact portions are reversed, and is brought in contact with the tire tread surface by reversing operation of the ground-contact portions.

10 Claims, 18 Drawing Sheets

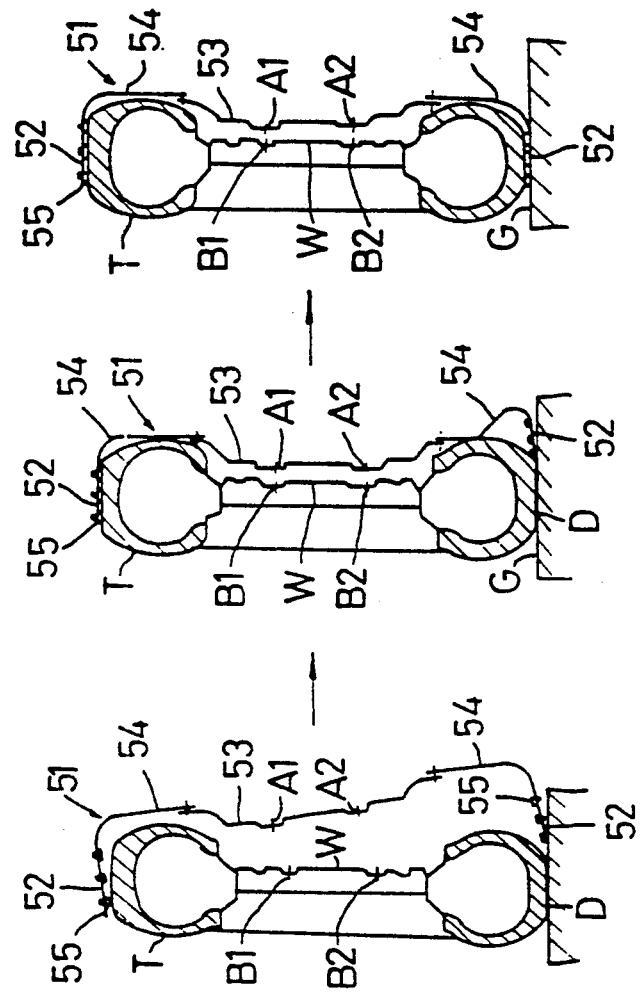

ANTI-SKID DEVICE FOR TIRE

FIELD OF THE INVENTION AND RELATED ART STATEMENT

The present invention relates to an anti-skid device mounted on the tire of an automobile.

When running on an icy road or a snow road, an automobile generally mounts anti-skid devices on the tires for preventing the slip of the tires. Such a tire anti-skid device has been disclosed, for example, in Unexamined Japanese Patent Publication Hei 2-151511.

The conventional tire anti-skid device includes a disk-like mounting portion; a plurality of side arms radially extending from the outer peripheral portion of the mounting portion in a manner to be circumferentially spaced to each other at specified intervals; and ground-contact portions constituted of the leading edges of the side arms bent in the axial direction of the mounting parts, and ground-contact rings for connecting the ground-contact portions to each other.

In mounting the anti-skid device, the mounting portion is removably mounted in a manner to be coaxial with the side surface of the vehicular wheel, the side arms are disposed along the side wall portion outside the tire, and the ground-contact portions and the ground-contact rings cover the outer periphery of the tire tread portion.

As one of the methods of mounting the anti-skid device on the tire, an automobile is lifted by a jack to float the tires from the road, and the anti-skid device is mounted. This makes it easy to fit the ground-contact rings around the outer peripheral portion of the tire tread; however, since the lifting by a jack takes troublesome, this method is little put in practice.

In general, as shown in FIG. 32, an anti-skid device 51 is mounted in the state that a tire T is grounded on a road G.

Namely, conventionally, in the case of mounting the above anti-skid device 51 on the tire T, first, as shown in FIG. 32(a), the ground-contact portions 52 of the anti-skid device 51 are partially put on the upper portion of the tire. A mounting member 53 is pushed on the wheel side so as to be made in parallel to a tire wheel W. Then, mounting holes A1 and A2 of the mounting member 53 are fitted to wheel nuts B1 and B2 previously mounted on the bolts of the tire wheel W respectively, and thereby the mounting member 53 is fixed on the tire wheel W. At this time, the ground-contact portions 52 of arms 54 to be abutted on a tread outer surface D of the tire T in contact with the ground G is projected outwardly as shown in FIG. 32(b).

Subsequently, by movement of the automobile by 2 to 3 m, the tire is turn by one time. Consequently, as shown in FIG. 32(c), the ground-contact portions 52 of the arms 54 are drawn by ground-contact rings 55 to be brought in contact with the outer peripheral tread surface D, thereby obtaining the suitable mounting state. Thus, it is possible to simply and rapidly mount the tire in one-touch without lifting the tire by a jack.

Incidentally, in the conventional technique, if the arms are low in rigidity, the ground-contact portions tend to be moved outwardly of the wheel at the curved road. In the worst case, the ground-contact portions are removed from the tire tread surface, as a result of which the automobile is slipped sideward. This makes difficult to travel the automobile along the aimed course. Accordingly, each arm must be made of a high rigidity elastic body. However, since the mounting member 2 must be relatively strongly pushed in mounting, if the rigidity of the arm is excessively high, there occurs a problem in that the wheel nuts cannot be fitted in the mounting holes of the mounting member. In particular, on the snow road, the operator is slipped at his feet and cannot exhaust his energy, and is difficult to mount the anti-skid device on the tire.

OBJECT AND SUMMARY OF THE INVENTION

Taking the above circumstances into consideration, the present invention has been made, and its object is to provide a tire anti-skid device capable of extremely easily and rapidly mounting the tire.

The above object is accomplished, according to the present invention, by the following technical means:

A tire anti-skid device comprises a mounting member removably mounted on a side surface of a wheel of an automobile in such a manner as to be coaxial with the wheel; a plurality of arms made of elastic bodies, which radially extend from the mounting member; ground-contact portions each being formed by bending the leading edge of each of the arms, which are intended to be brought in contact with a tire tread surface; a ground-contact ring for connecting the adjacent ground-contact portions with each other, which is intended to be brought in contact with the tire tread surface; and reverse portions each being formed at a junction portion between the arm and the ground-contact portion, which are intended to reverse the ground-contact portions in such a manner that the inner surfaces in contact with the tire tread surface becomes the outer peripheral surfaces.

In mounting the tire anti-skid device of the present invention to the tire wheel, first, the ground-contact portions and the ground rings are reversed. Specifically, they are reversed through the reversed portions in such a manner that the inner surfaces thereof in contact with the tire tread surface become the outer surfaces.

Subsequently, in the reversed state, the mounting portion is mounted on the tire wheel. Since the ground-contact portions are reversed, the mounting portion is easily mounted.

Then, the ground-contact portions are reversed through the reversed portion in such a manner that the ground-contact portions on the upper side are abutted on the tire tread surface. Since the tire tread surface is in contact with the ground, the ground-contact portions on the lower side cannot be brought in contact with the tire tread surface.

In such a state, the automobile is moved, and the tire is rotated by one time. Thus, the ground-contact portions on the upper side abutted on the tread surface are moved on the lower side, and the ground-contact portions on the lower side are reversed to be abutted on the tire tread surface. Consequently, the ground-contact portions and the ground-rings extend over the circumferential length, and are perfectly fitted around the tire tread surface.

According to the present invention, since the reversed portions are provided at the junction portions between the arms and the ground-contact portions, it is possible to easily perform the reverse operation. Consequently, in mounting the mounting member on the wheel, the stretch of the arms is eliminated, and the mounting member can be easily mounted without strongly pressing it on the wheel.

Also, according to the present invention, it is possible to extremely easily and rapidly mounting the mounting member on the wheel, and hence to extremely improve the mounting workability.

BRIEF DESCRIPTION OF THE DRAWINGS

FIGS. 32(a) to 32(c) are views for explaining the conventional mounting works.

DETAILED DESCRIPTION OF THE PREFERRED EMBODIMENT

Hereinafter, the preferred embodiments of the present invention will be described with reference to the drawings.

Figure 1:
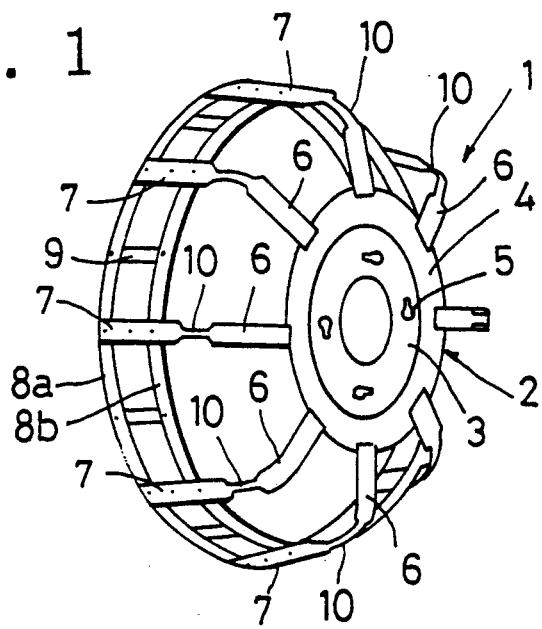
FIG. 1 is a perspective view of a tire anti-skid device showing a first embodiment of the present invention.

Referring to FIG. 1, a tire anti-skid device 1 has a disk-like mounting member 2 made of metal or synthesis resin. The mounting member 2 includes an inner disk 3, and an outer ring 4 relatively rotatably fitted around the inner disk 3. The inner disk 3 is provided with wheel mounting holes 5.

A plurality of arms 6 extend radially outwardly from the outer peripheral portion of the outer ring 4 in a manner to be circumferentially spaced to each other at equal intervals. The leading edge of each arm 6 is axially bent, to form a ground-contact portion 7. The adjacent ground-contact portions 7 are connected to each other by two ground-contact rings 8a and 8b disposed in parallel to each other. The two ground-contact rings 8a and 8b are connected to each other by connection portions 9 between the adjacent ground-contact portions 7.

A reverse portion 10 is formed at a junction portion between each arm 6 and each ground-contact portion 7. The reverse portion 10 can reverse the ground-contact portion 7 in such a manner that the inner peripheral surfaces of the ground-contact portion 7 and the ground-contact rings 8a and 8b become the outer peripheral surfaces.

The arm 6, reverse portion 10 and ground-contact portion 7 are integrally formed of an elastic body. As a material of the arm 6, there is used a high rigidity elastic material such as a rubber, resin or the like containing a core material such as an organic fabric, for example, nylon fabric. Also, each of the ground-contact rings 8a and 8b is made of an elastic material such as a rubber, synthetic resin or the like, which is superior in wear resistance to the above arm 6.

The reverse portion 10 is lower in rigidity than the arm 6 and the ground-contact portion 7. As one of concrete means of reducing the rigidity, the reverse portion 10 is made narrower in width than the arm 6 and the ground-contact portion 7, to be lowered in rigidity than the arm 6, thereby making easy the reverse operation of the ground-contact portion 7.

Figure 2:
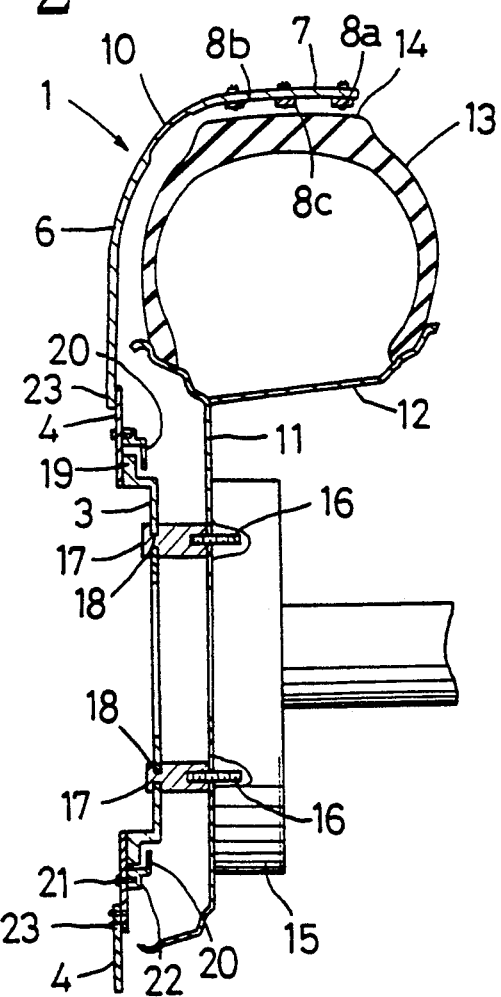
FIG. 2 is a sectional view showing the state that the anti-skid device is mounted on a wheel.

FIG. 2 shows a tire anti-skid device 1 having a construction slightly changed from that as shown in FIG. 1. In FIG. 2, a tire 13 is mounted on a rim 12 of a wheel 11 of an automobile. The outer peripheral surface of the tire is referred to as a tread surface 14. The wheel 11 is fixed on a flange 15 of the axle end portion by screwing wheel nuts 17 with bolts 16 projecting from the flange 15. A peripheral groove 18 is provided at the leading edge of each wheel nut 17.

A ring-like fitting collar portion 19 is formed around the outer peripheral portion of the inner disk 3 of the mounting portion 2 of the tire anti-skid device 1. A holding ring 20 for holding the fitting collar portion 19 is fixed around the inner peripheral portion of the outer ring 4 of the mounting member 2 through bolts 21 and nuts 22. The fitting collar portion 19 is fitted in the groove formed between the outer ring 4 and the holding ring 20, and the outer ring 4 and the inner disk 3 are made to be relatively rotatable.

The base end portion of each arm 6 is rigidly fixed on the outer peripheral portion of the outer ring 4 by rivets 23 or the like.

The tire anti-skid device 1 is fixed on the wheel 11 by engagement of the peripheral grooves 18 of the wheel nuts 17 to the wheel mounting holes 5 of the inner disk 3. In such a mounting state, the mounting member 2 is in parallel to the wheel 11, and the arms 6 are disposed along the side wall of the tire 13. Also, the ground-contact portions 7 and the ground-contact rings 8a and 8b are brought in contact with the tread surface 14.

Also, since the outer ring 4 and the inner disk 3 are relatively rotatable, when the ground-contact portions 7 and the ground-contact rings 8a and 8b are applied with an excessive torque, if the tire 13 is rotated, they are relatively slid, so that an excessive force is not applied on the tire anti-slid 1, thus increasing the durability.

In addition, in the anti-skid device 1 as shown in FIG. 2, three of ground-contact rings 8a, 8b and 8c are provided. Also, the reverse portion 10 is made thinner than the arm 6 and the ground-contact portion 7, to be lowered in rigidity, thereby making easy the reverse operation.

Figure 3:
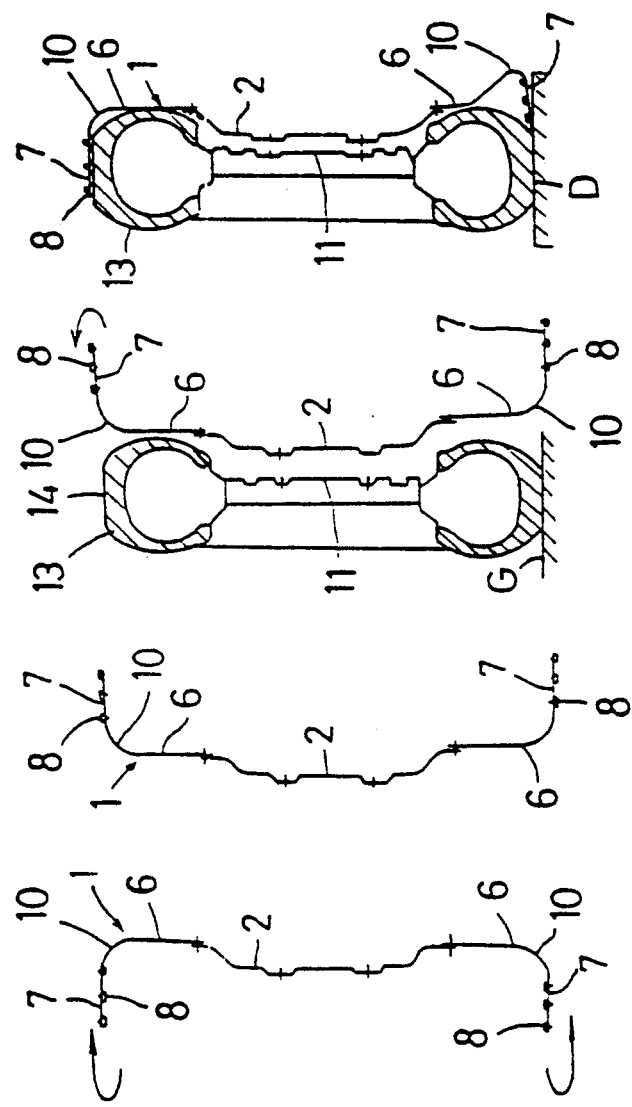
FIGS. 3(a) to 3(d) are views for explaining the mounting works according to the embodiment of the present invention.

FIGS. 3(a) to 3(d) show a method for mounting the above tire anti-skid device 1. In mounting the anti-skid device 1 on the tire 13, first, the ground-contact portion 7 of the anti-skid device 1 in the normal state as shown in FIG. 3(a) is reversed through the reverse portion 10 by application of a force in the direction of the arrow. This reverse operation is made so as not to enlarge the diameter of the ground-contact ring 8, but to put the reversed portion 10 inside the ground-contact ring 8.

FIG. 3(b) shows the state that the inner peripheral surface of the ground-contact portion 7 is reversed into the outer peripheral surface. In this reversed state, as shown in FIG. 3(c), the mounting member 2 is set on the wheel 11, and the mounting hole 5 is fitted to the wheel nut 17. Then, the mounting member 2 is slightly rotated to fit the mounting hole 5 in the peripheral groove 18 of the wheel nut 17, and is fixed by a stopper (not shown). (The mounting between the wheel 11 and the mounting member 2 is shown in FIG. 2.)

Since the mounting member 2 is mounted on the wheel 11 in the state that the ground-contact portion 7 is reversed as shown in FIG. 3(c), differently from the state as shown in FIGS. 32(a) and 32(b) in the conventional manner, the mounting is made easy.

Next, as shown in the arrow of FIG. 3(c), the ground-contact portion 7 on the upper side is reversed in the original direction through the reverse portion 10.

FIG. 3(d) shows the state that the ground-contact portion 7 is reversed. At this time, since the lower portion of the tire 13 is brought in contact with the road surface, the above reverse operation is perfectly performed on the upper portion, whereas it is imperfectly performed on the lower portion. Then, the automobile is moved by 2 to 3 m, and the tire 13 is turned by one time. Thus, the ground-contact portion 7 on the lower side is drawn by the ground-contact ring 8, and is reversed in a manner to be brought in contact with the outer peripheral tread surface 14 of the tire 13, to thereby form the suitable mounting state.

In addition, the above arm 6 is made of a synthesis resin such as urethane resin, rubber compound, or composite material of the above material buried with each of various fabric layers, metal wire, thin spring steel sheet, wire or the like, which may be made of a high rigidity elastic body capable of being bending-reversed. Also, the present invention may be naturally applied to an anti-slid device wherein the fixing means for fixing the mounting member 2 to the wheel 11 uses the headed bolts for fixing the wheel.

Figure 4:
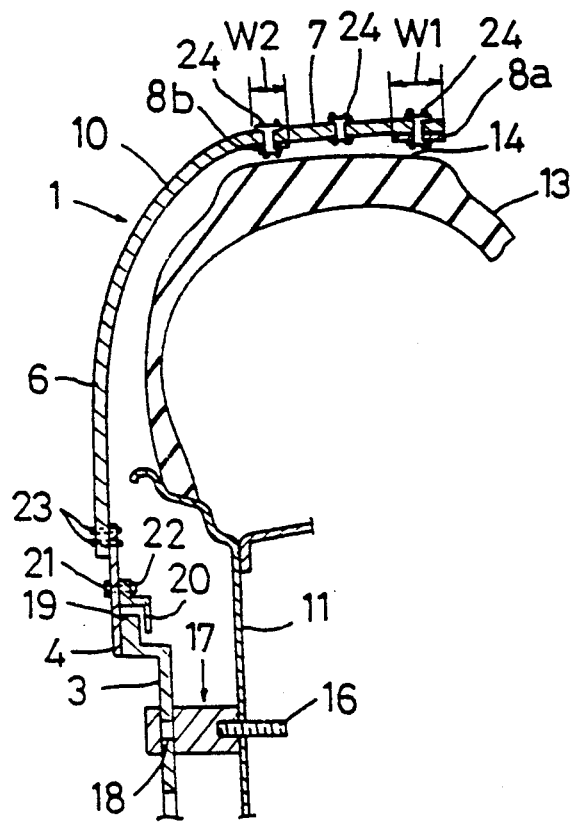
FIG. 4 is an enlarged vertical sectional view of a main part of an anti-skid device showing a second embodiment.

FIG. 4 shows a second embodiment. The arm 6, reverse portion 10 and the ground-contact portion 7 are made of a high rigidity elastic body, for example, a synthesis resin such as urethane resin, a rubber or a rubber compound, or a composite material of the above material buried with a core material such as each of various fabrics, a woven fabric, a metal wire, or the like. The reverse portion 10 is made lower in rigidity than the ground-contact portion 7. In addition, the whole of the arm 6 may be used as the reverse portion 10 with a low rigidity.

The ground-contact rings 8a and 8b are formed in endless using an elastic material such as a rubber or synthesis resin. A width W1 of the ring 8a on the inner side of the tire (on side apart from the reverse portion 10) is made wider than a width W2 of the ring 8b on the reverse portion side (on the outside of the tire). Namely, as compared with the ground-contact ring 8b on the outside of the tire, the ground-contact ring 8a on the inner side is made wider in the ground-contact area, and made larger in the friction coefficient. Both the ground-contact rings 8a and 8b are integrally formed on the inner surface by vulcanization or the like.

In addition, one or more of the other ground-contact rings may be provided between the ground-contact rings 8a and 8b, to thus obtain three, or four or more of ground-contact rings.

Spike pins 24 are provided on the ground-contact rings 8a and 8b and the ground-contact portion 7.

In the above embodiment, the width of the ground-contact ring 8b on the side near the reversed portion 10 side is made narrower in width as compared with the other one, so that it is reduced in rigidity, to thereby exert no adverse effect on the reverse operation of the reverse portion 10, thus making easy the reverse operation.

On the contrary, since the width of the ground-contact ring 8b on the side near the reverse portion side is narrower, the contact force between the tire tread surface 14 and the same is weakened, and accordingly, the ground-contact ring 8b tends to be shifted from the tire tread surface 14 in turning.

However, since the ground-contact ring 8a on the inner side of the tire is larger in its contact area, the contact force between the tire tread surface 14 and the same is made larger. Accordingly, in turning of the automobile or the like, the ground-contact ring 8a is prevented from being shifted outwardly of the tire 13. Thus, the ground rings 8a and 8b of the tire anti-skid device 1 are not shifted from the tread surface 14, to thereby sufficiently achieve the slip preventive function of the tire 13.

Figure 5:
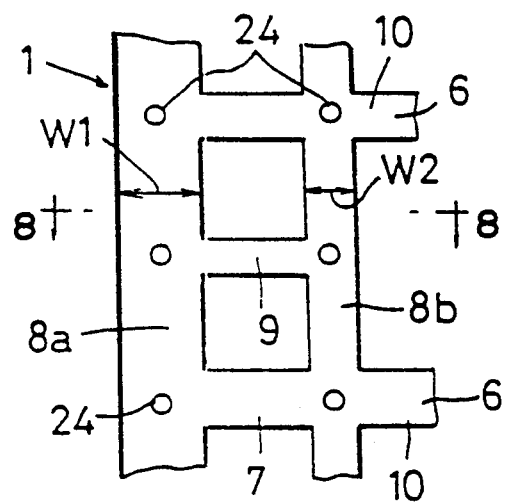
FIG. 5 is a plan view showing a main part of a third embodiment.

FIG. 5 shows a main part of a third embodiment, which is different from the above embodiments in that the arm 6, ground-contact rings 8a and 8b and connecting portion 9 are integrally formed of the same material. This embodiment is expected to achieve the same effect as in the above embodiments.

Figure 6:
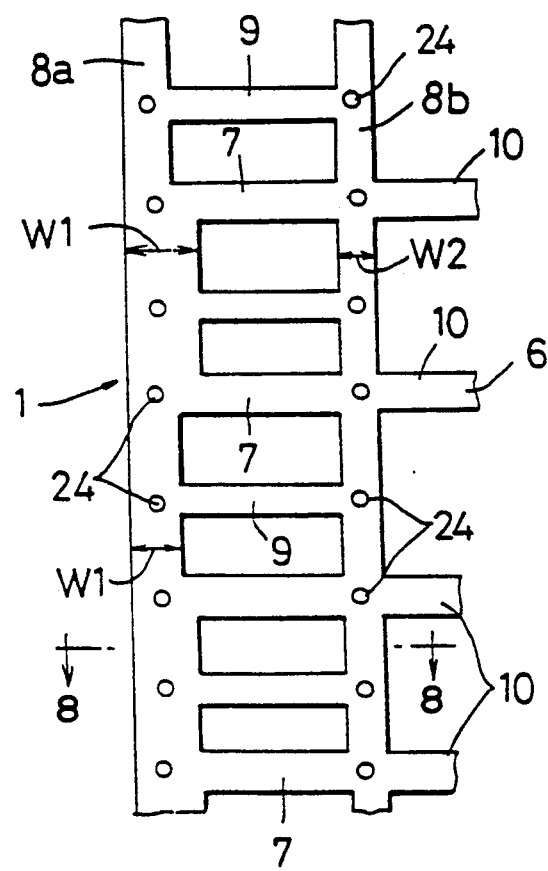
FIG. 6 is a plan view showing a main part of a fourth embodiment.

FIG. 6 shows a fourth embodiment, which is different from the above embodiments in that the width of the ground-contact ring 8a on the inner side of the tire is made wider in the circumferential direction at several points as compared with the other portion. This embodiment is expected to achieve the same effect as in the above embodiments.

Figure 7:
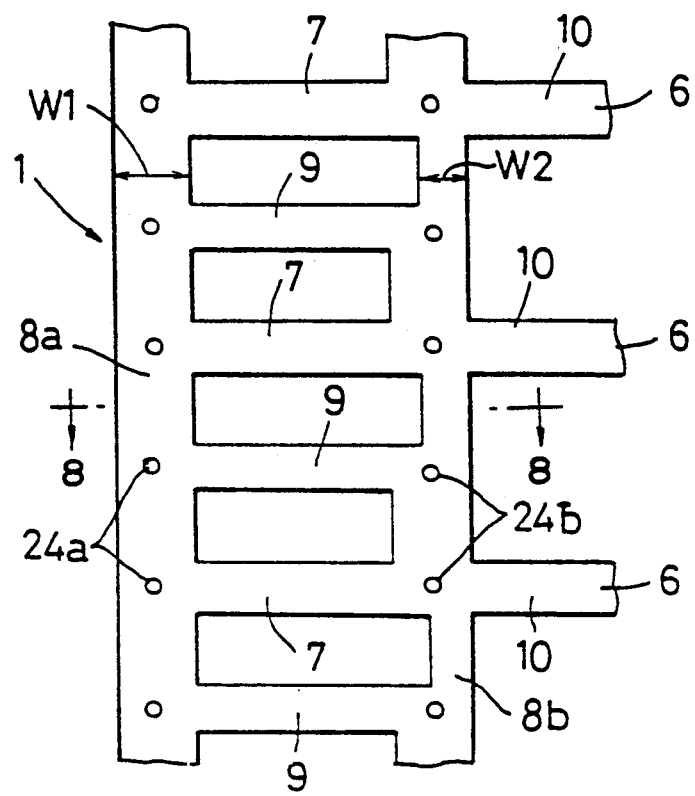
FIG. 7 is a plan view showing a main portion of the fourth embodiment.
Figure 8:
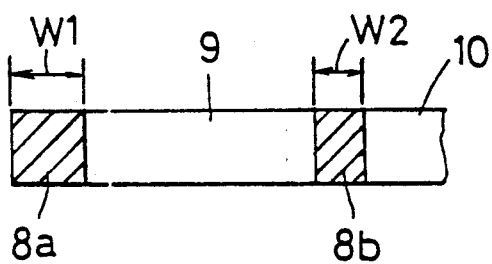
FIG. 8 is a sectional view taken along the line A—A of each of FIGS. 5 to 7.

FIGS. 7 and 8 show a main part of the other embodiment, which is different from the above embodiments in that the width of the ground-contact ring 8a on the inner side of the tire is made narrower at several points in the circumferential direction as compared with the other portion. This embodiment is expected to achieve the same effect as in the above embodiments.

Figure 9:
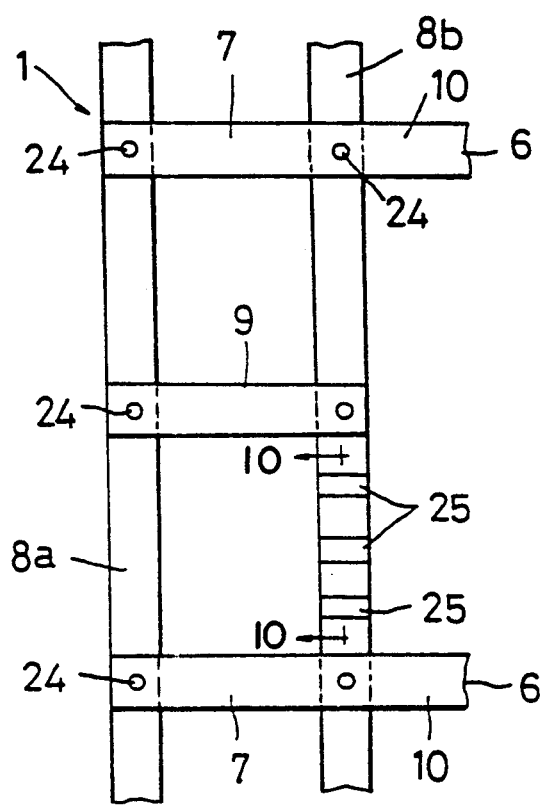
FIG. 9 is a plan view showing a main part of a fifth embodiment.
Figure 10:
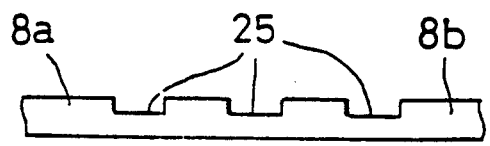
FIG. 10 is a sectional view taken along the line F—F of FIG. 9.

FIGS. 9 and 10 show a main part of a fifth embodiment, which is different from the above embodiments in that the widths of the ground-contact rings 8a and 8b are the same, and the recessed portions 25 are provided on the ground-contact surface of the ring 8b on the reverse portion side at suitable portions (for example, the circumferential length between the ground-contact portions 7) at suitable intervals (for example, in the intervals between the ground-contact portions 7), so that the ground-contact area on the reverse portion 10 side is made smaller.

Figure 11:
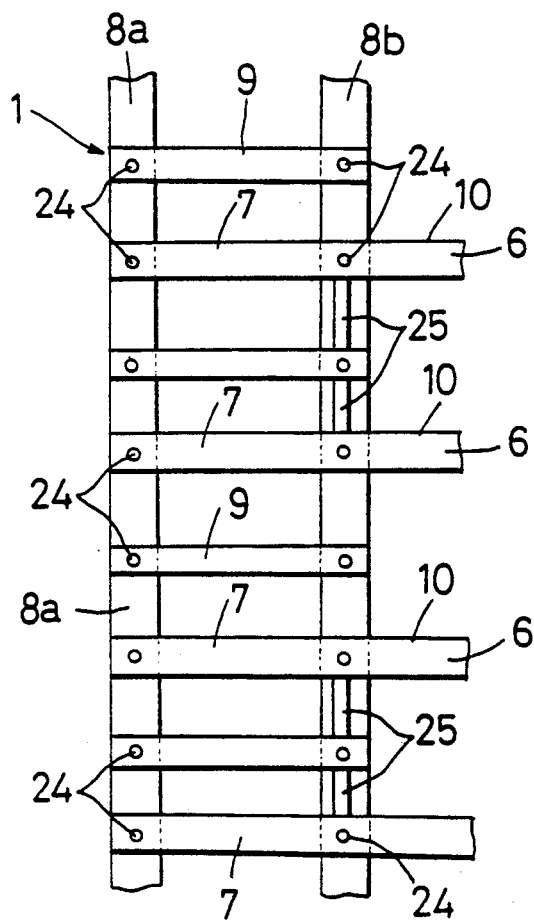
FIG. 11 is a plan view showing a main part of a sixth embodiment.

FIG. 11 shows a main part of a sixth embodiment, which is different from the above embodiments in that the recessed portions 25 are formed in suitable intervals in the circumferential direction.

In addition, in each embodiment described above, the arm 6, reverse portion 10, ground-contact portion 7, ground-contact rings 8a and 8b, and connection portion 9 can be integrally formed of the same material.

Further, the ground-contact ring 8a on the tire inner side and the ground-contact ring 8b on the outer side can be formed of different rubbers or synthesis resins. For example, the ground-contact ring 8a on the inner side is made of a rubber having a high skid resistance or a rubber having a low hardness, to thus increase the ground-contact pressure. Also, the thickness of the ground-contact ring 8a on the inner side is larger than that of the other ground-contact ring 8b, to thus increase the friction coefficient. Namely, the ground-contact ring 8b on the reverse portion side is easily deformed, to be easily reversed through the reverse portion 10.

Figure 12A:
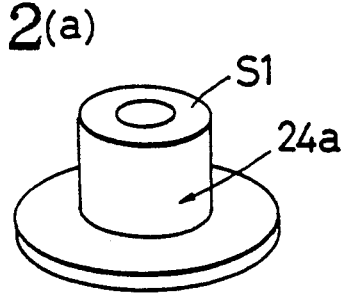
FIG. 12(a) is a perspective view of a spike pin provided on a ground-contact ring on the inner surface of a tire.
Figure 12B:
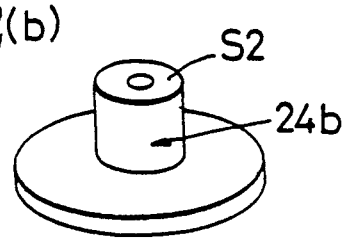
FIG. 12(b) is a perspective view of a spike pin provided on a ground-contact ring on the inner surface of the tire.

Also, as shown in FIGS. 12(a) and 12(b), a ground-contact area S1 of a spike 24a rigidly fixed on the ground-contact ring 8a on the inner side of the tire is larger than a ground-contact area S2 of a spike 24b rigidly fixed on the ground-contact ring 8b on the reverse portion 10 side, which makes it possible to increase the friction coefficient of the ground-contact ring 8a on the inner side of the tire, and hence to prevent the shift of the ground-contact ring 8a from the space between the tire tread surface 14 and the road surface.

Figure 13:
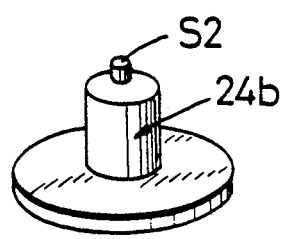
FIG. 13 is a perspective view showing another example of a spike pin provided on the ground-contact ring on the inner surface of the tire.

In addition, as shown in FIG. 13, the spike pin 24b can be made slender into a peak.

Figure 14:
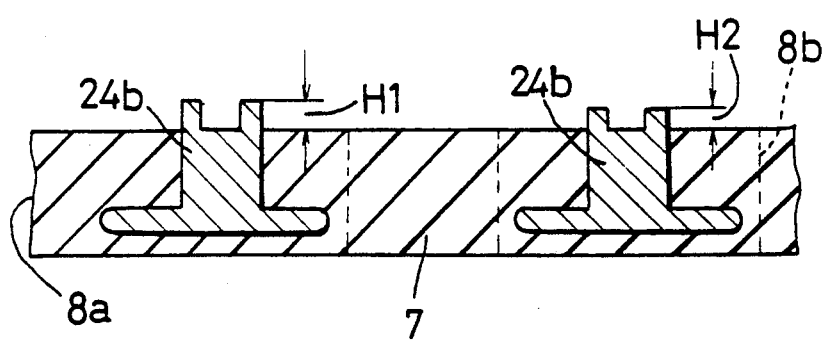
FIG. 14 is a sectional view showing the other example of a spike pin provided on the ground-contact ring.
Figure 15:
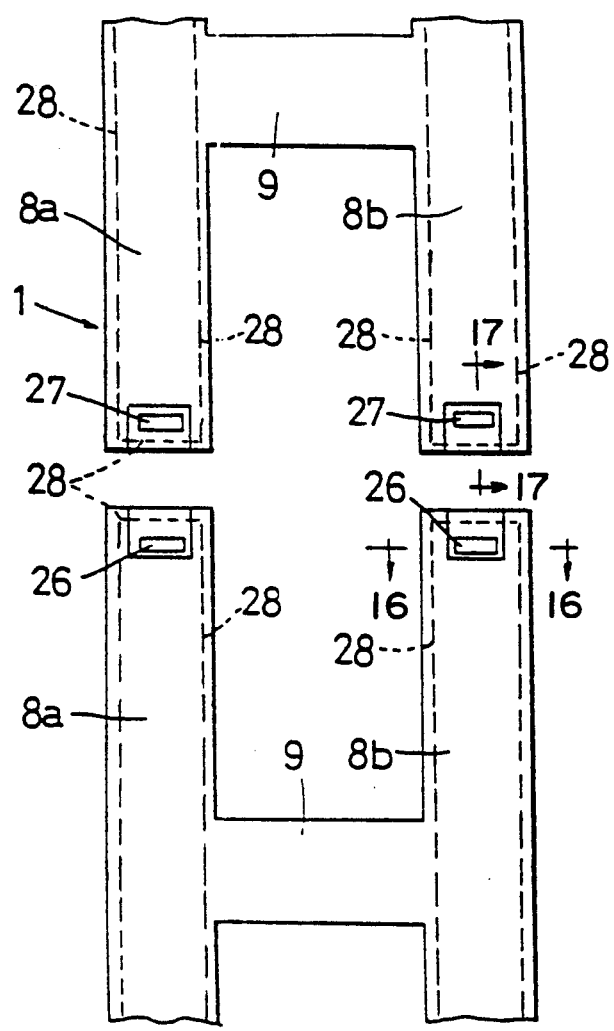
FIG. 15 is a plan view showing a main port of seventh embodiment of an anti-skid device.
Figure 16:
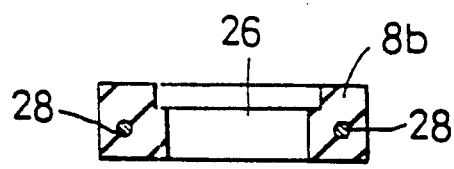
FIG. 16 is an enlarged sectional view taken along the line B—B of FIG. 15.
Figure 17:
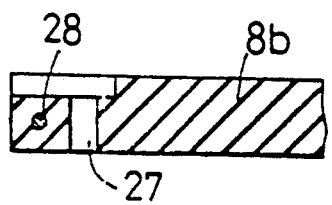
FIG. 17 is an enlarged sectional view taken along the line C—C of FIG. 15.

As shown in FIG. 14, by making higher the chip projecting height H1 of the spike pin 24a on the inner side of the tire than the chip projecting height H2 of the spike pin 24b on the tire outer side, it is possible to increase the friction coefficient on the tire inner side, and hence to prevent the shift from the ground-contact during running. This makes it possible to stabilize the operation and to sufficiently achieve the slip preventive function.

Figure 18:
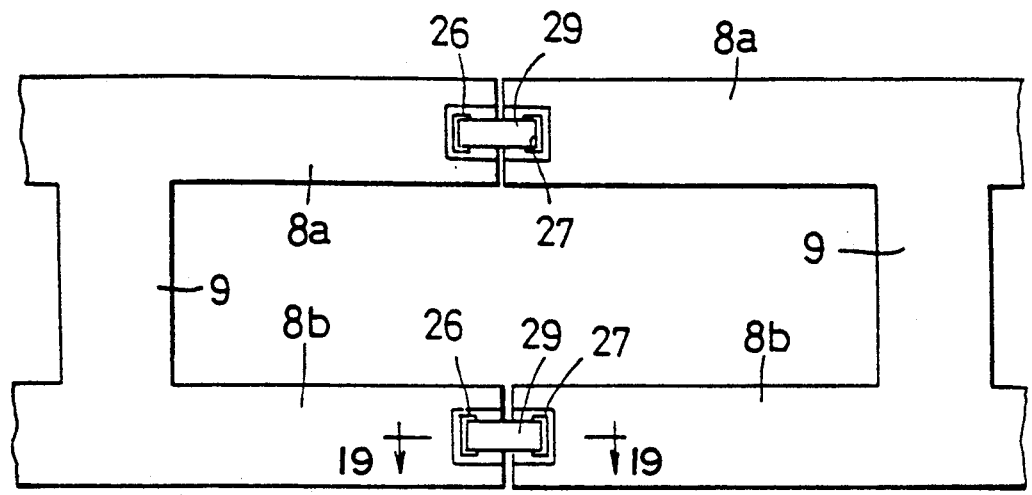
FIG. 18 is a plan view showing the ring connection state of FIG. 15.
Figure 19:
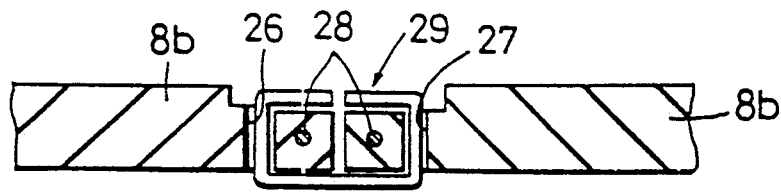
FIG. 19 is an enlarged sectional view taken along the line D—D of FIG. 18.
Figure 20:
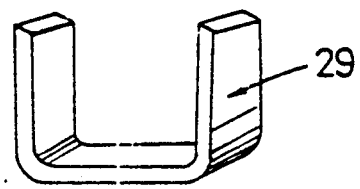
FIG. 20 is a perspective view of a connecting metal fitting.

FIGS. 15 to 20 show a main part of a seventh embodiment, wherein each of the ground-contact rings 8a and 8b are circumferentially divided into a plurality of parts, connection holes 26 and 27 are respectively provided on the connection portions thereof, and a core material 28 is buried in the ground-contact ring on the peripheral edge of each connecting hole. A U-shaped connecting metal fitting 29 as shown in FIG. 20 is inserted in each of the connecting holes 26 and 27, and which is bent at both ends as shown in FIGS. 18 and 19 to be caulked, so that the divided rings 8a and 8b are connected to thus form the endless ground-contact ring.

Figure 21:
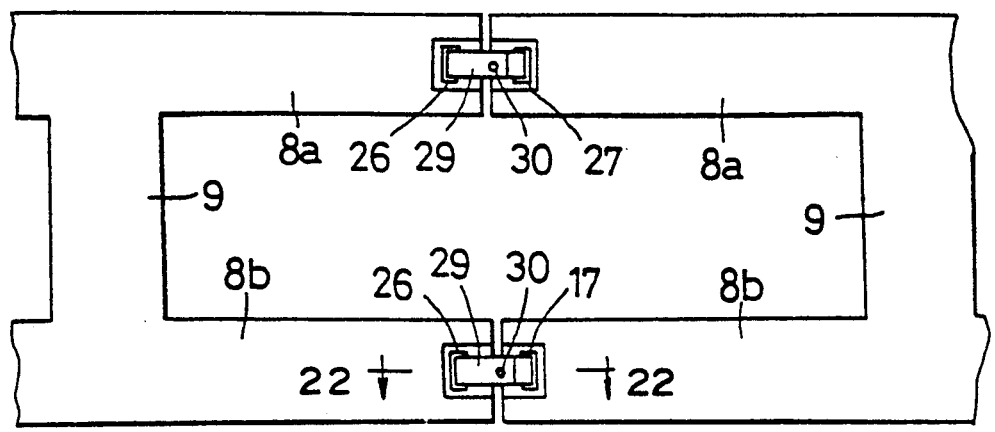
FIG. 21 is a plan view showing a main part of eighth embodiment.
Figure 22:
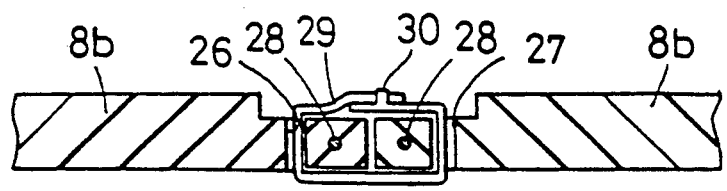
FIG. 22 is an enlarged sectional view taken along the line E—E of FIG. 21.
Figure 23:
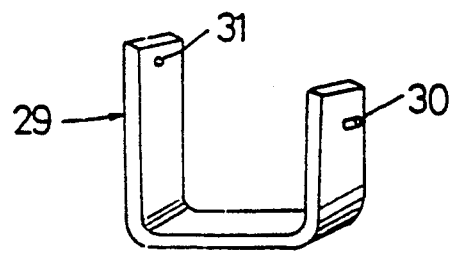
FIG. 23 is a front view showing a connecting metal fitting of another example.
Figure 24:
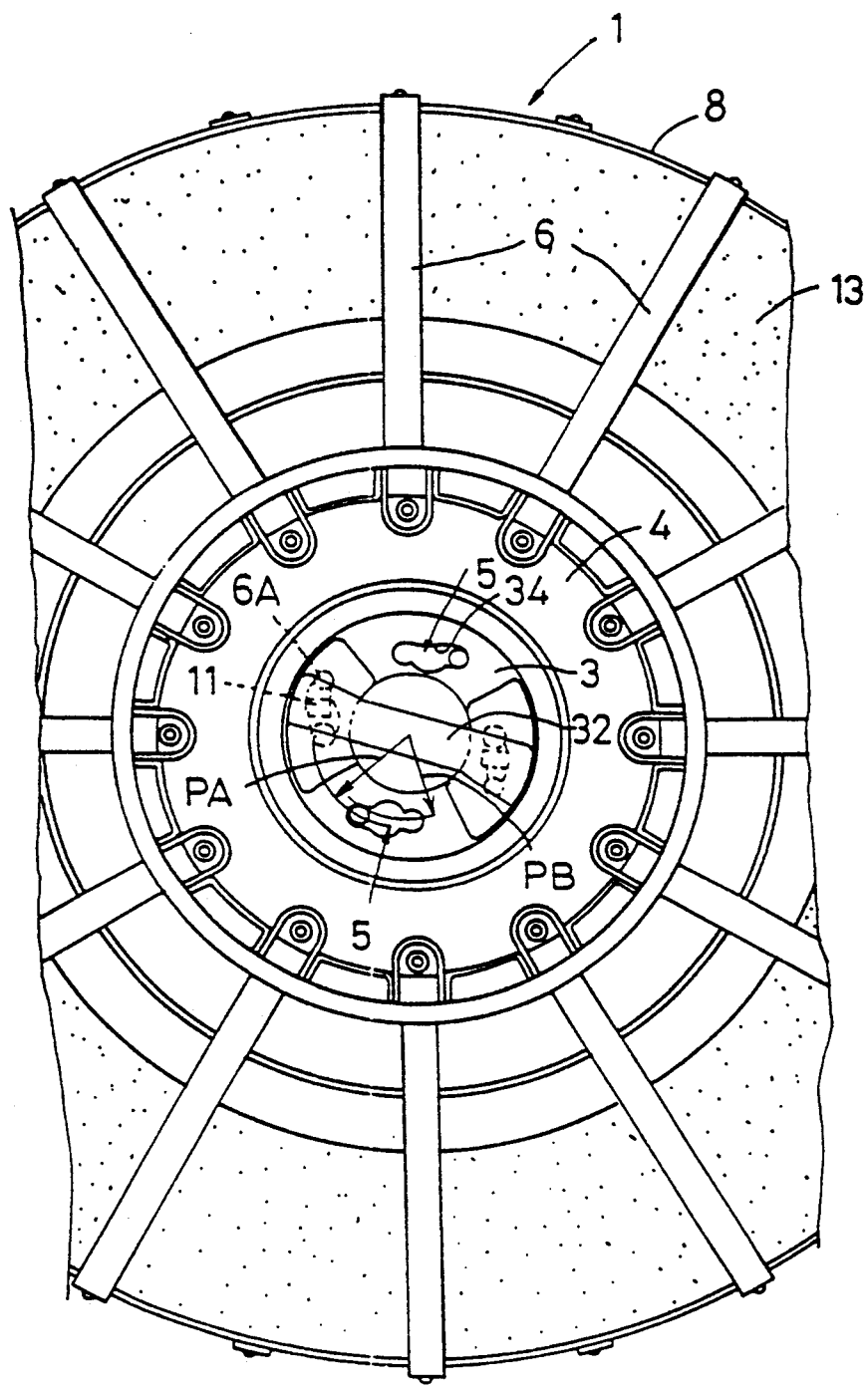
FIG. 24 is a front view showing a ninth embodiment.
Figure 25:
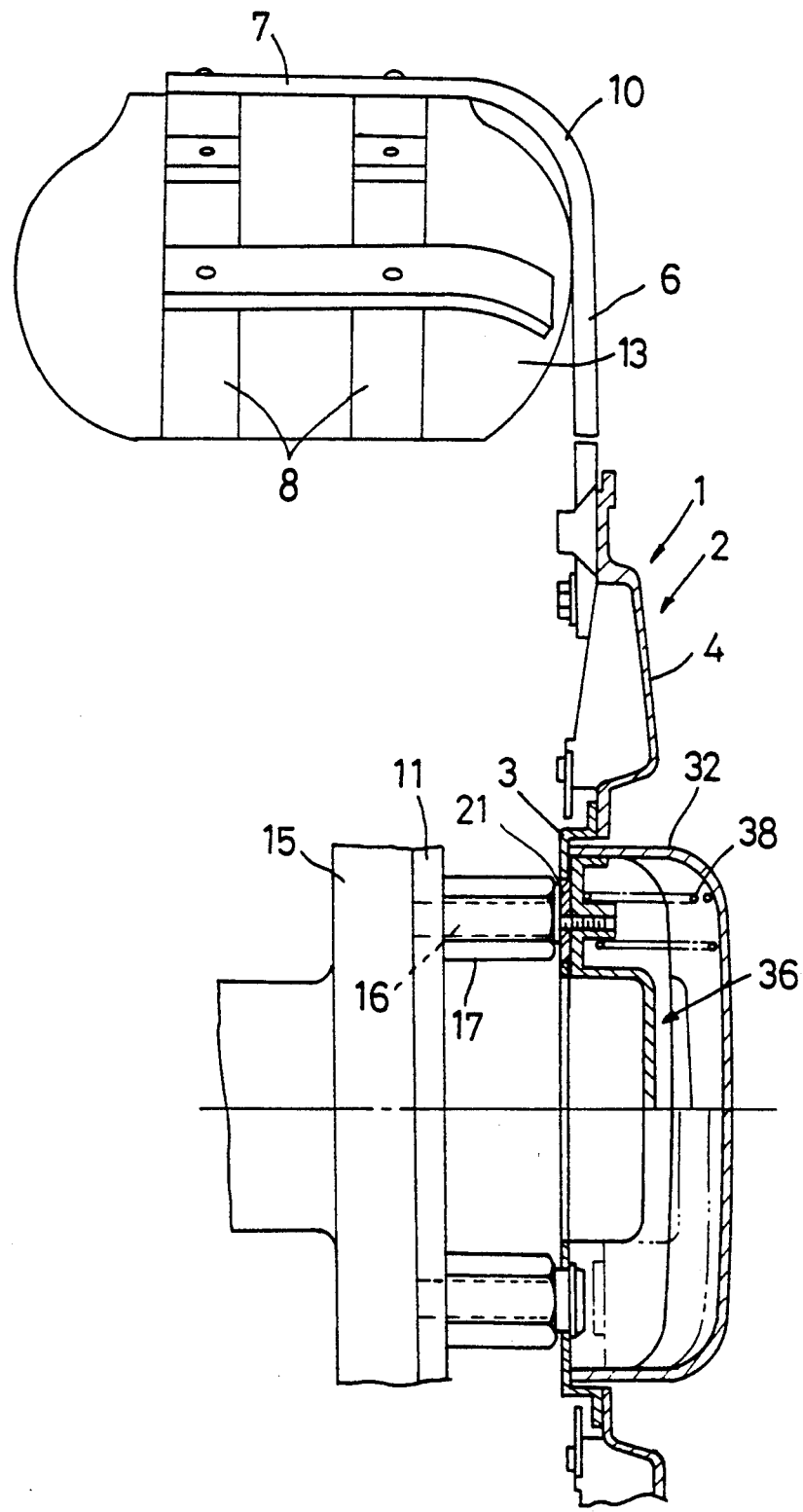
FIG. 25 is a side sectional view of FIG. 2.
Figure 26:
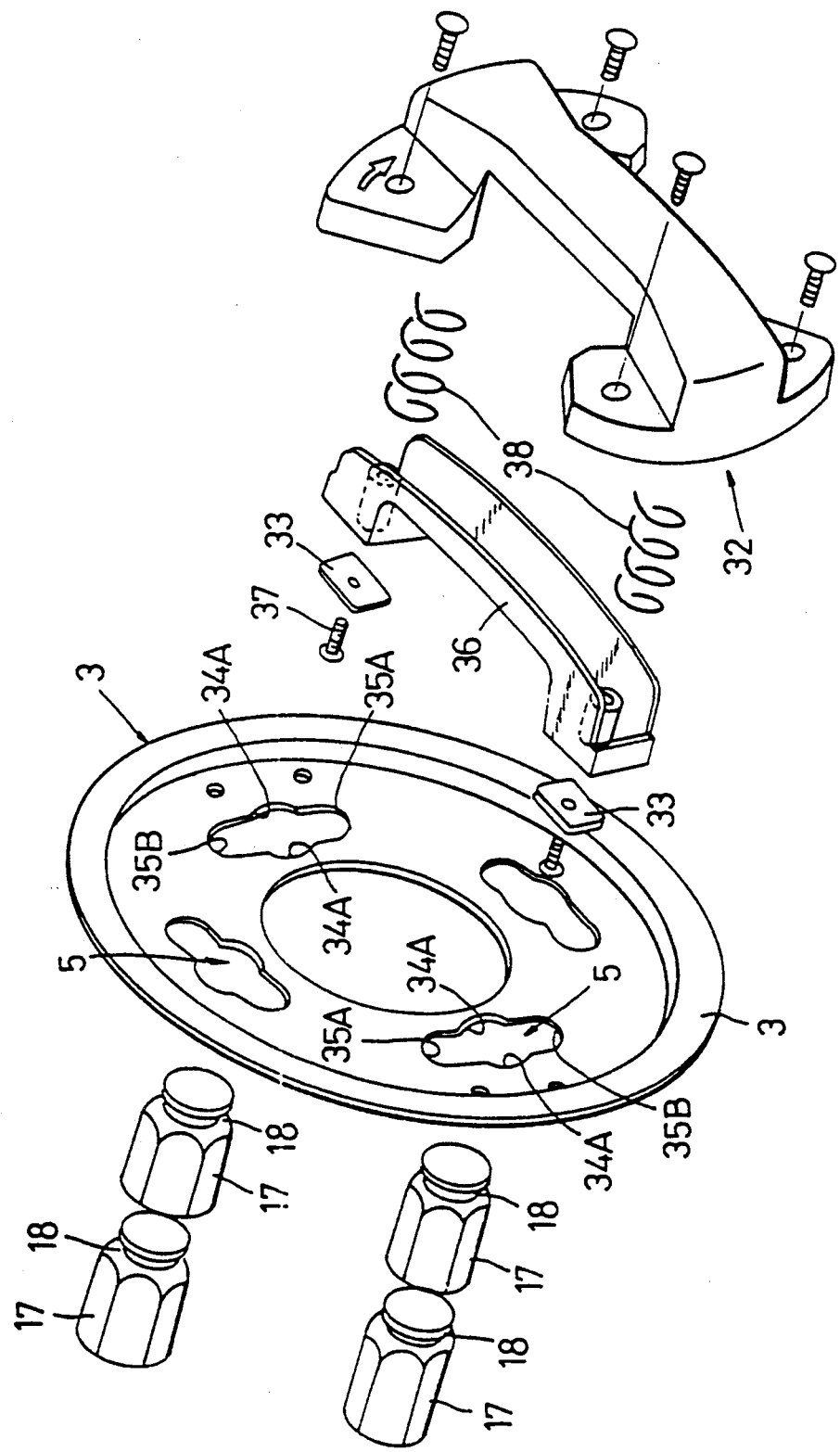
FIG. 26 is a exploded perspective view of a main part of FIG. 24.

FIGS. 21 to 23 show an eighth embodiment, which is different from the above embodiments in that the connecting metal fitting 29 in the above embodiment is provided with a locking pin 30 and a pin hole 31 for certainly and strongly performing the connection.

Even in the above embodiment, the width of the ground-contact ring 8a on the tire inner side is made wider than the ground-contact ring 8b on the tire outer side, which makes it possible to prevent the shift of the ground-contact ring 8a from the space between the tire tread surface 14 and the road surface.

According to the above embodiments, in the case that a part of the ground-contact portion is cut-off due to the damage, by replacing the damaged divided portion of the ground-contact rings 8a and 8b, it is possible to easily repair and to improve the durability. Also, it is possible to miniaturize the equipment in terms of manufacture, and hence to reduce the production cost.

FIGS. 24 to 31 fully show a mounting apparatus for mounting the tire anti-skid device 1 to the wheel 11.

On a flange 15 at the end portion of the axle, four (or five or six) of wheel bolts 16 are planted. A tire wheel 11 is fitted to the wheel bolts 16, and fastened by wheel nuts 17. In each wheel nut 17, the leading edge is formed in a circular shape, and a peripheral groove 18 is formed short of the end surface. An inner disk 3 of a mounting member 2 of the anti-skid 1 is mounted on the wheel nuts 17.

The inner disk 3 has four wheel mounting holes 5 which are spaced by 90° in the circumferential direction. A handle 32 is fixed on the inner disk 3 in such a manner as to block two holes 5, of four holes 5, disposed so as to be opposed to each other by 180°. Stopper bodies 33 are disposed within the handle 32.

Figure 27:
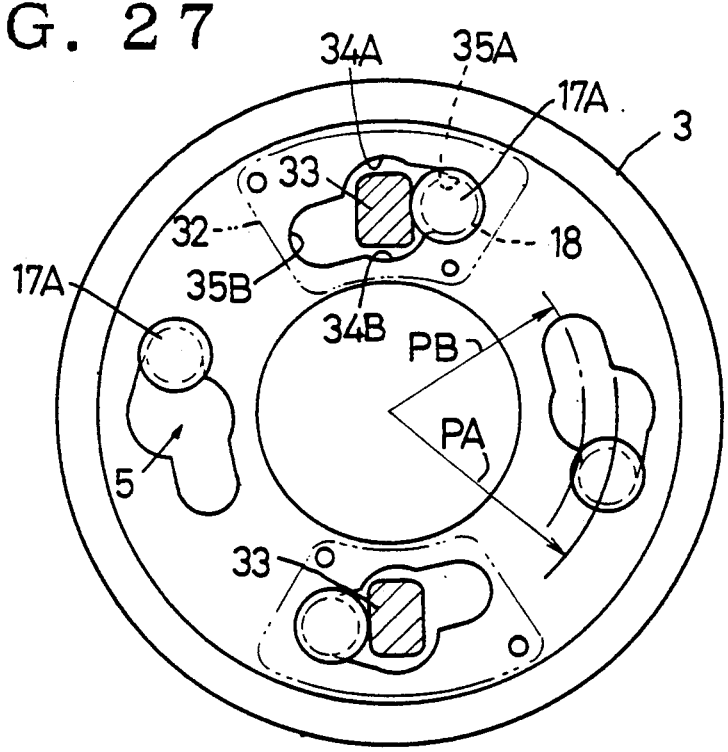
FIG. 27 is a front sectional view showing the state of using the mounting hole.
Figure 28:
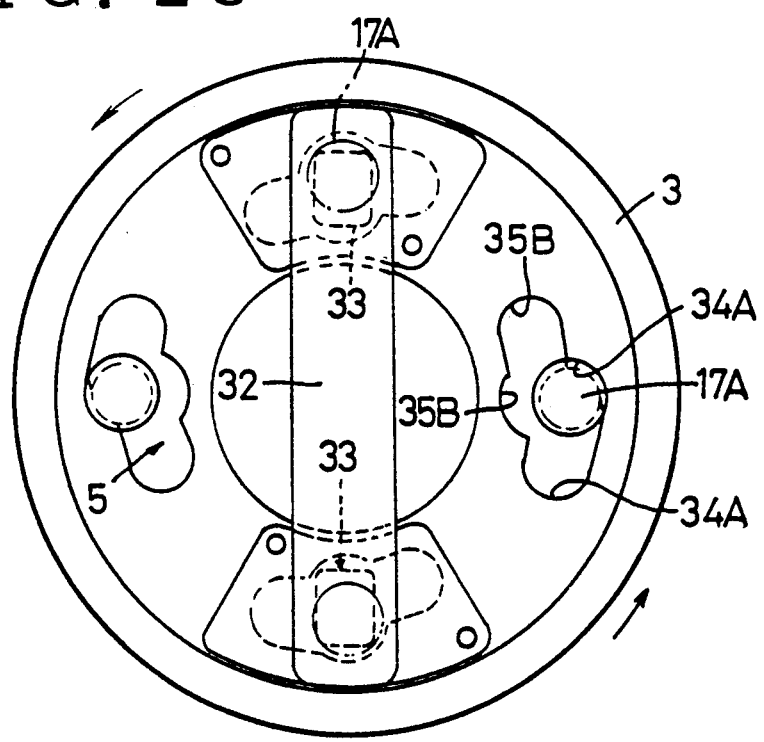
FIG. 28 is a front view showing the state that the mounting plate is mounted.

As shown in FIGS. 27 and 28, each of the wheel mounting holes 5 has a first fitting hole 34A and a first mounting hole 35A disposed so as to correspond to a first pitch circle radius PA of the first (large diameter) wheel nut 17A, and a second fitting hole 34B and a second mounting hole 35B disposed so as to correspond to a second pitch circle radius PB of the second (small diameter) wheel nut 17B.

Since the first fitting hole 34A and the second fitting hole 34B are formed on the same position in the circumferential direction, they are partially overlapped, and have the sizes enough to be fitted to the leading edges of the first and second wheel nuts 17A and 17B, respectively.

The first and second mounting holes 35A and 35B are formed so as to be continuously and oppositely to the first and second fitting holes 34A and 34B, respectively. The first mounting hole 35A has a diameter smaller than the outside diameter of the leading edge of the first wheel nut 17A, and has approximately the same diameter as the peripheral groove 18. The second mounting hole 35B has a diameter smaller than the outside diameter of the leading edge of the second wheel nut 17B, and has approximately the same diameter as the peripheral groove 18.

By turning the inner disk 3 in the state that the first fitting hole 34A is fitted to the first wheel nut 17A, the first mounting hole 35A is engaged with the peripheral groove 18, and the inner disk 3 is prevented from the movement in the axial direction of the first wheel nut 17A. Similarly, by turning the inner disk 3 in the state that the first fitting hole 34B is fitted to the first wheel nut 17A, the first mounting hole 35B is engaged with the peripheral groove 18, and the inner disk 3 is prevented from the movement in the axial direction of in the first wheel nut 17B.

The handle 32 is intended to turn the inner disk 3, and which is screwed with the inner disk 3, which is formed to be hollow, and stopper bodies 33 having an approximately similar shape are disposed so as to be slidable in the axial direction of the wheel nut.

The stopper bodies 33 are mounted on both ends of a grasp body 36 having a U-shape in the side view by vises 37. Between the grasp body 36 and the handle 32, coil springs 38 are provided for energize the grasp body 36 on the inner disk 3 side. The stopper bodies 33 can be advanced in the fitting holes 34A and 34B, respectively. By movement of the grasp body 36 on the handle 32 side against the coil spring 38, the stopper bodies 33 are retreated from the fitting holes 34A and 34B.

Figure 30:
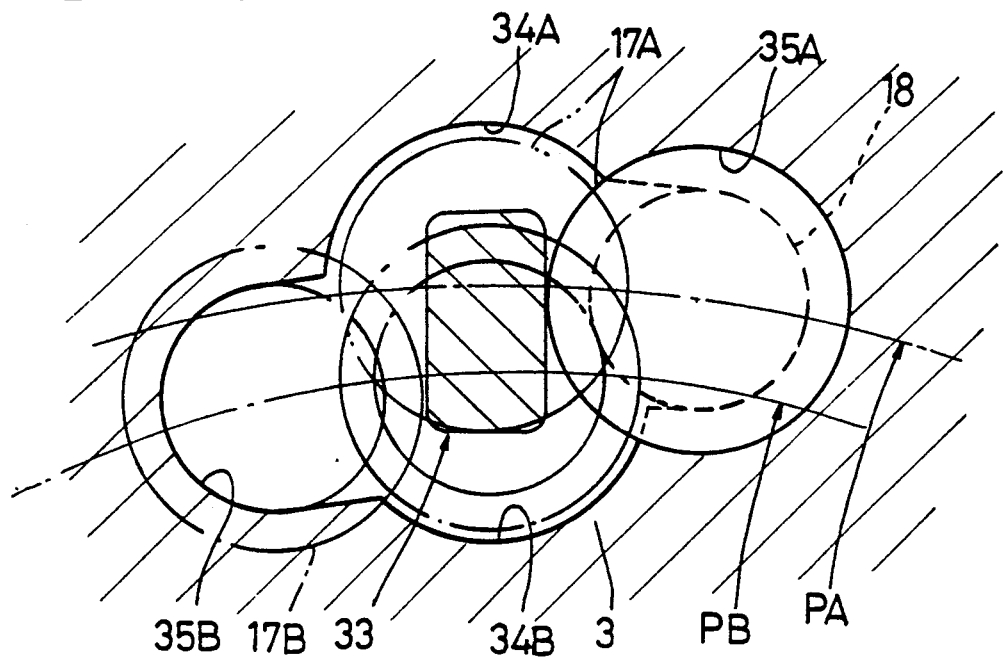
FIG. 30 is an enlarged explanatory view of a main portion.

In addition, the center of the stopper body 33 may be mated with the center of the fitting hole 34A. However, as shown in FIG. 30, it is preferably mated with the center of the overlapped portion of the fitting holes 34A and 34B.

The stopper body 33 is usually located at a specified position against the inner disk 3. For example, when the first fitting hole 34A is fitted in the first wheel nut 17A (as shown in FIG. 28), the stopper body 33 is abutted on the leading edge surface of the first wheel nut 17A to be retreated. On the other hand, when the inner disk 3 is turned in one direction, and the first mounting hole 35A is engaged with the peripheral groove 18 of the first wheel nut 17A (as shown in FIG. 27), the stopper body 33 is shifted and removed from the leading edge surface of the first wheel nut 17A, to be advanced in the first fitting hole 34A by the energizing force of the coil spring 38, so that the side surface thereof is abutted on the outer peripheral surface of the first wheel nut 17A. Accordingly, the return operation of the turning of the inner disk 3 is prevented, and the first mounting hole 35A is kept to be engaged with the peripheral groove 18.

The release of the inner disk 3 from the first wheel nut 17A is made by retreating stopper body 33 while grasping the handle 32 and the grasp body 36, and then turning the inner disk 3, to thus face the first fitting hole 34A to the first wheel nut 17A.

Figure 29:
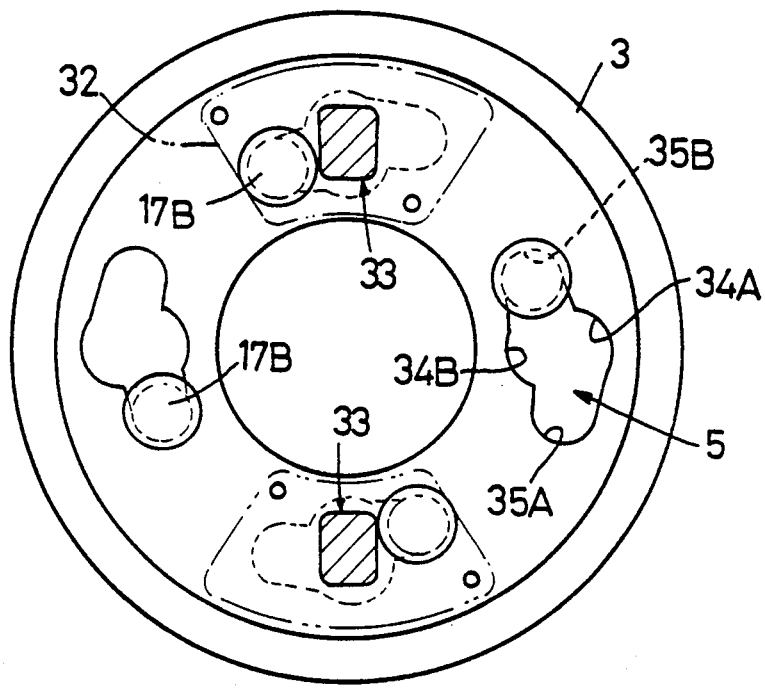
FIG. 29 is a front sectional view showing the state that different mounting holes are mounted.

In addition, FIG. 29 is a view for explaining the usage of the second wheel nut 17B.

Figure 31:
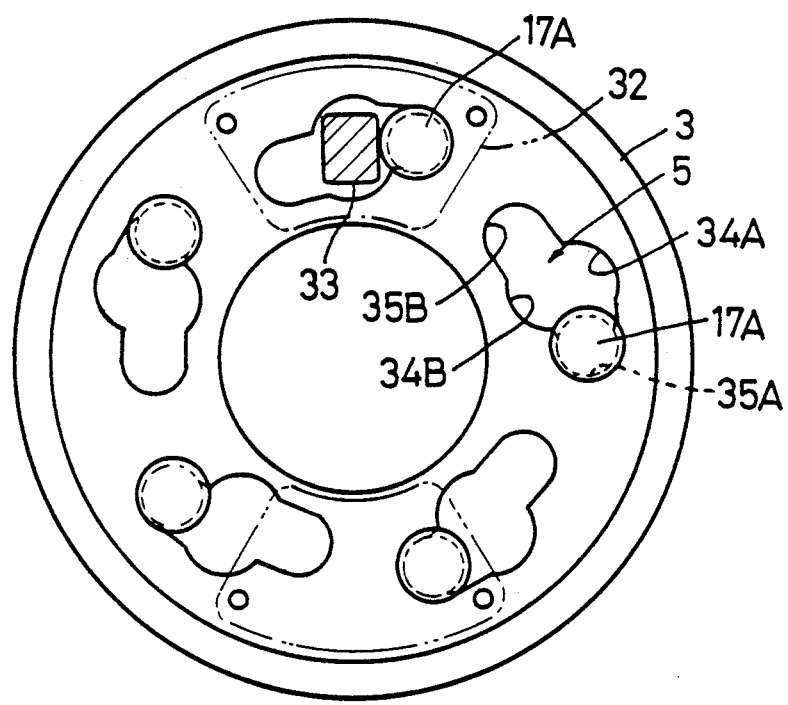
FIG. 31 is a front sectional view showing tenth embodiment wherein the number of the wheel nuts is different from each other.

FIG. 31 shows a main part of the tire anti-skid device for five wheel bolts, wherein the inner disk 3 has wheel mounting holes formed by assembly of the fitting holes 34A and 34B and the mounting holes 35A and 35B, which are disposed at the five points in the circumferential direction.

The handles 32 are mounted at the position where one hole 5 is blocked and the position which is displaced by 180° and has no hole. The stopper body 33 is provided only at the one end of the grasp body 36, and is abutted on one wheel nut 17 for preventing the return of the turning of the inner disk 3.

In addition, the grasp body 36 and the stopper body 33 may be integrally formed.

The preferred embodiments described above are for illustrative purpose only, and the present invention is not limited thereto except as defined in the appended claims. Various modifications, therefore, may be made without departing from the spirit and scope of the claim.

What we claim is:

1. A tire anti-skid device comprising:
    a mounting member removably mounted on a side surface of a wheel of an automobile in such a manner as to be coaxial with said wheel;
    a plurality of arms made of elastic bodies, which radially extend from said mounting member, said arms having base portions, leading ends and reversing portions therebetween and being connected to the mounting member at said base portions;
    ground-contact portions, each being formed by bending a leading end of each of said arms, which are intended to be brought in contact with a tire tread surface;
    a ground-contact ring for connecting said adjacent ground-contact portions with each other, which is intended to be brought in contact with said tire tread surface; and
    said reversing portions each being formed at a junction portion between the base portion of a respective said arm and said ground-contact portion thereof, said reversing portions being differently constructed relative to the remainder of the arms to facilitate reversal of said ground-contact portions in such a manner that the inner surfaces in contact with said tire tread surface becomes the outer peripheral surfaces.

2. A tire anti-skid device according to claim 1, wherein said base portion, said ground-contact portion and said reversing portion are integrally formed of an elastic body, and said reversing portion is lower in rigidity than said base portion and said ground-contact portion.

3. A tire anti-skid device according to claim 2, wherein said reversing portion is made to be thinner in thickness than said arm and said ground-contact portion.

4. A tire anti-skid device according to claim 2, said reversing portion is made narrower in width than said arm and ground-contact portion.

5. A tire anti-skid device according to claim 1, wherein a plurality of said ground-contact rings are provided in axially spaced relationship to each other, the ground-contact area of a one of said ground-contact rings that is axially near said reversing portion is smaller than that of a one of said ground-contact rings which is axially far from said reversing portion.

6. A tire anti-skid device according to claim 1, wherein a plurality of said ground-contact rings are provided in axially spaced relationship to each other, the width of a one of said ground-contact rings that is axially near said reversing portion is smaller than that of a one of said ground-contact rings which is axially far from said reversing portion.

7. A tire anti-skid device according to claim 1, wherein a plurality of ground-contact rings are provided, the width of said ground-contact ring on the side near said reversing portion is made partially narrower at specified intervals in the circumferential direction.

8. A tire anti-skid device according to claim 6, recessed portions are formed on the one of said ground-contact rings that is axially near said reversing portion at predetermined intervals in the circumferential direction.

9. A tire anti-skid device according to claim 1, wherein a plurality of said ground-contact rings are provided in axially spaced relationship to each other, the friction coefficient of a one of said contact rings that is axially near said reversing portion is larger than that of a one of said ground-contact rings that is axially far from said reversing portion.

10. A tire anti-skid device according to claim 1, wherein said mounting member comprises an outer ring having inner and outer peripheral surfaces for supporting the base portions of said arms, and an inner disk relatively rotatably mounted on the inner peripheral surface of said outer ring;

said inner disk is formed with first fitting holes fitted to first wheel nuts arranged along a first pitch circle (PA) and first mounting holes engaged with peripheral grooves formed in said first wheel nuts; and second fitting holes fitted on second wheel nuts arranged along a second pitch circle (PB) and second mounting holes engaged with peripheral grooves formed on said second wheel nuts;

said first and second fitting holes are juxtaposed in such a manner as to be opposed to each other radially of said inner disk, and said first and second mounting holes are juxtaposed in such a manner as to be opposed to each other circumferentially of said inner disk through said first and second fitting holes;

a rotating handle is fixed on said inner disk; and stopper bodies, which advance to said first fitting holes and are abutted on the outer peripheral surfaces of said first wheel nuts fitted in said first mounting holes, are retreatably provided in said rotating handle.

* * * * *